US007106192B2

(12) United States Patent
Johnson et al.

(10) Patent No.: US 7,106,192 B2
(45) Date of Patent: Sep. 12, 2006

(54) SECURITY CHECKPOINT

(75) Inventors: Lisa M. Johnson, Alexandria, VA (US); Jay Michael Reseigh, Denver, CO (US); Michael Joseph Arnold, Jr., Atlanta, GA (US); Kimberly F. DeShong, Tampa, FL (US)

(73) Assignee: Accenture Global Services GmbH, Schaffhausen (CH)

( * ) Notice: Subject to any disclaimer, the term of this patent is extended or adjusted under 35 U.S.C. 154(b) by 486 days.

(21) Appl. No.: 10/395,880

(22) Filed: Mar. 25, 2003

(65) Prior Publication Data
US 2004/0189469 A1    Sep. 30, 2004

(51) Int. Cl.
G08B 21/00    (2006.01)

(52) U.S. Cl. .................. 340/540; 340/551; 340/552; 340/561

(58) Field of Classification Search ............... 340/540, 340/541, 552, 561
See application file for complete search history.

(56) References Cited

U.S. PATENT DOCUMENTS

| | | | | |
|---|---|---|---|---|
| 5,845,692 A | * | 12/1998 | Kellem et al. ............. 160/118 |
| 6,057,761 A | * | 5/2000 | Yukl ....................... 340/568.1 |
| 6,484,650 B1 | * | 11/2002 | Stomski ....................... 109/6 |
| 6,507,278 B1 | * | 1/2003 | Brunetti et al. ............. 340/541 |
| 6,724,304 B1 | * | 4/2004 | Risi ............................ 340/540 |
| 2003/0213184 A1 | * | 11/2003 | Hunt et al. ................... 52/36.1 |
| 2004/0252024 A1 | * | 12/2004 | Huey et al. ................. 340/540 |
| 2005/0057354 A1 | * | 3/2005 | Jenkins et al. .............. 340/522 |

* cited by examiner

Primary Examiner—Jeffery Hofsass
Assistant Examiner—Samuel J Walk
(74) Attorney, Agent, or Firm—Hogan & Hartson LLP

(57) ABSTRACT

An improved security checkpoint separates certain individuals into a secure, enclosed wanding station for additional security screening. The wanding station may be constructed using glass (or other strong, visually transparent substance) and metallic (such as aluminum or steel) posts so that people may be securely enclosed in the wanding station but still have a direct line of sight to personal items being screened at another location. The size of the wanding station may vary according to the needs of the checkpoint but preferably has room to screen three people simultaneously. The wanding station may include an entry area in which people form a queue, optimally of six people, for entering the wanding station. Two or more personal and item screening areas may share a wanding station to form a double lane module. The security module is configured so that most people pass straight through the checkpoint, and people leaving the wanding station can easily obtain their items without delaying others. The security module may further include a small item x-ray or other screening device positioned near the wanding station to expedite the screening within the wanding station.

29 Claims, 8 Drawing Sheets

Exemplary
Double Lane
Checkpoint
Module
400

Exemplary Double Lane Checkpoint Module 400

SECURITY CHECKPOINT

FIELD OF THE INVENTION

The present invention provides an improved security checkpoint configuration that processes people efficiently, improves public satisfaction, and provides improved security.

BACKGROUND OF THE INVENTION

Security measures allow the public to continue to live normal lives in an increasingly dangerous world. Because of the increasing dangers, security precautions are becoming common aspects of modern life. For example, security checkpoints at airports and other public locations provide increased safety to the public through the screening, location, and collection of harmful items, thereby helping to prevent the presence of these harmful items in the public locations. In exchange for this increased safety, the public trades inconvenience and loss of privacy.

To help ensure the general acceptance of security checkpoints, the checkpoints should minimize the costs to the public. Various performance measures quantify these costs to the public. For instance, the delay time associated with a checkpoint may be measured, and the security checkpoint may be modified to minimize the delays.

Conventional security checkpoint configurations typically suffer from several disadvantages. Primarily, the conventional checkpoint may not process the public with optimal efficiency. Because of resulting delays, the public is frequently dissatisfied with the conventional security checkpoint configurations. Even if the delays associated with a checkpoint are minimal, the checkpoint may cause public dissatisfaction for unnecessary delays and for the perception of unnecessary delays.

Specifically, chaos may occur in a conventional security checkpoint as the "clean" (people and items cleared through the checkpoint) and "dirty" (uncleared) people mingle. The mingling may cause delays as people travel back and forth through checkpoint. The mingling may also create potential security concerns as a "dirty" person flagged for additional screening is allowed to interact with other people or retrieve her bags, prior to the additional screening. Thus, the mingling presents the opportunity to dispose of a suspicious object with a person or item that had already cleared inspection.

Furthermore, the conventional security checkpoints do not use available space and allocate relatively expensive search equipment efficiently. Instead, the conventional checkpoints are generally installed haphazardly.

Also, people passing through the checkpoint are separated from some of their items, creating a potential for loss or theft of the items. Conventional checkpoint configurations generally do not address this problem.

SUMMARY OF THE PRESENT INVENTION

In response to these and other needs, the present invention provides an improved security checkpoint that separates flagged individuals for further searching, apart from their possessions and other people. These identified people are led to a secure, enclosed area, hereafter referred to as a wanding station. The wanding station is an area physically separated from personal and item screening areas. This design comfortably contains dirty people (e.g., those that raise an alarm when passing through a metal detector) and prevents these people from interacting with other people or retrieving their items until completion of the personal screening. Thus, the present invention has the benefit of lessening the chance of a security breech by containing people within the enclosed wanding station until they are cleared.

The present invention has the further benefit of controlling the flow of traffic through the checkpoint and, thus, lessening the above-described, undesired mingling at the security checkpoint. In this way, the present invention has the added benefit of lessening delays to most people (those not selected for further searching) by allowing them to quickly pass through the checkpoint without waiting for the additional screening of others.

As described above, the wanding station is a unique physical structure for separating and holding people during the additional screenings. The wanding station may be formed by ropes between stanchions or other movable barriers. In a preferred embodiment, the wanding station is constructed using glass (or another strong, visually transparent substance) and metallic (such as aluminum or steel) posts so that people may be securely enclosed in the wanding station but still have a direct line of sight to personal items being screened at another location on an x-ray belt.

The size of the wanding station may vary according to the needs of the checkpoint, provided that the wanding station has enough room and space for the necessary additional screening. In one implementation, the wanding station is dimensioned to provide adequate space within the wanding station for three people to be screened by security personnel at the same time.

If the wanding station is filled to capacity, the security checkpoint module may close to prevent more people from entering the wanding station. To minimize the frequency of closings of the security checkpoint module, a preferred embodiment of the wanding station includes an entry area in which people form an entry queue to the wanding station. This design increases passenger throughput through the checkpoint by increasing the number of the people separated toward the wanding station before impeding the throughput of the personal screening area. In a particular implementation, the entry area (or neck) is designed to hold six passengers.

In another embodiment, the present invention provides a double lane module in which two or more personal and item screening areas share a wanding station. The double lane module of the present invention may generally be employed at any location, regardless of vertical or horizontal spatial restrictions.

Another embodiment of the present invention provides a security checkpoint configuration that uses specific positioning and dimensions of some of the security equipment to improve the throughput of the checkpoint. Specifically, the double lane module is designed to ensure people that do not cause an alarm, who comprise a majority of people passing through the security checkpoint, can quickly and easily proceed from a walkthrough metal detector straight through to the x-ray machine, obtain their bags from the rollers and proceed with minimal delay. To achieve this goal, the walk through metal detector is positioned close to an x-ray unit, preferably in the range of 12 inches apart.

The double lane module is also preferably configured so that people leaving the wanding station can easily obtain their items without delaying others. Specifically, a person exits the wanding station after an alarm is cleared and move directly to retrieve her items. To facilitate this design, a roller extension to the x-ray machine (for screening items)

may be employed to provide the additional length as needed to prevent the people from having to walk upstream, against the flow of other people.

In another embodiment of the present invention, the security module further includes a small item x-ray or other screening device. These screening devices are positioned near the wanding station to expedite the screening within the wanding station. For instance, a person can be screened within the wanding station while their personal items (such as shoes) are concurrently examined by the small item x-ray.

In another embodiment of the present invention, multiple modules are positioned together to form security checkpoint. The modules are configured according to the needs of the checkpoint and according to available resources. The security checkpoint may further include special line configurations for entering the security checkpoint.

BRIEF DESCRIPTION OF THE DRAWINGS

These and other advantages of the present invention are described more fully in the following drawings and accompanying text in which like reference numbers represent corresponding parts throughout.

DETAILED DISCLOSURE OF THE PREFERRED EMBODIMENT

Figure 1:
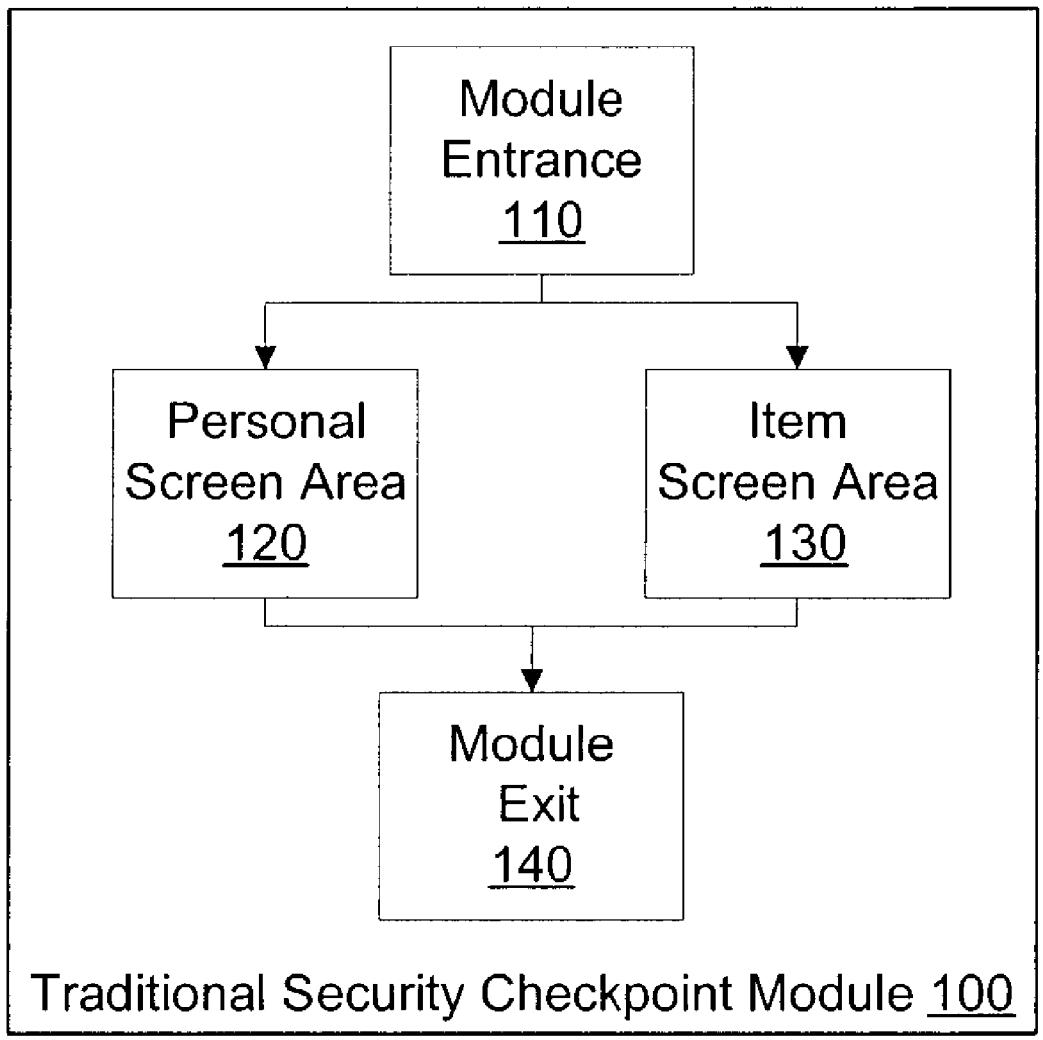
FIG. 1 (Prior Art) is a schematic illustration of a traditional security checkpoint module.

A traditional security checkpoint module 100 is schematically depicted in FIG. 1 (PRIOR ART). In the known checkpoint module 100, people enter a checkpoint module entrance 110 where they generally prepare for search before entering a personal screen area 120. In the checkpoint module entrance 110, the people also place any baggage and items into an item screen area 130. After completion of the personal and item screens, the people recollect their items and leave the security checkpoint through a checkpoint exit 140.

First, a person enters the security checkpoint entrance 110. In some instances, only people having a ticket are allowed to enter the security checkpoint. Thus, one aspect of the checkpoint entrance 110 may be an examination of tickets. The checkpoint entrance 110 may further include gates, doors or other structures to prevent people from bypassing the checkpoint.

In the security checkpoint entrance 110, people prepare for personal and item screening, described below. For instance, people in the security checkpoint entrance 110 prepare for screening in the personal screen area 120 by removing keys, coins, jewelry, cell phones or other metallic objects that may interfere with security examinations. Similarly, people in the security entrance 110 prepare for item screening in item screening area 130 by placing items into the item screening area 130 and by identifying special items, such a laptop computer or camera equipment, that require separate searching.

In the personal screen area 120, a person is screened by some type of rapid scanning device, such as a walk through metal detector (WTMD). Certain people activate an alarm, thereby requiring resolution of the personal screen alarm. Increasing the sensitivity of the personal screening device increases the percentage of people that activate the alarm.

A personal screen alarm is resolved before the person can leave the checkpoint 100. The person causing the alarm may return to the checkpoint entrance 110, remove one or more items, and re-enter the personal screen area 120 to repeat the screening. Alternatively, security workers may close the personal screening area 120 and perform other screening tests as needed to resolve the alarm. For example, the security workers may use a hand-held metal detector ("HHMD") or other screening techniques (such as a frisk) to identify objects causing the alarm. Unfortunately, these processes delay other people waiting to enter the personal screening area 120.

Returning to FIG. 1, a person initiates the item screening in item screening area 130 by placing an item into the item screening area 130. The item is then screened using known technology. Typically, the item screening uses some type of x-ray device that allows security officials to see into the item. If the x-ray device produces an alarm, then the alarm must be resolved through more detailed screening before that item is allowed through the security checkpoint. After the item screening alarm is resolved or if the item did not produce an item screening alarm, the item may be cleared and the item screening ends.

The resolving of the item screen alarm in the item screening area generally entails a more thorough examination of the item, as necessary for the security checkpoint of interest. For instance, in an airport, security officials may test the item for presence of prohibited chemicals. If needed, the security officials may also manually search the item to identify the cause for the alarm. It should be appreciated that other security tasks or combinations of tasks may be incorporated as well. Also, the extent of the manual search may vary according to the results of the x-ray. Specifically, the manual search may vary depending on whether a restricted item is seen during screening.

The screening of a person's items in area 130 and screening of the person in area 120 occur concurrently to expedite the security process. However, as suggested above, the item screening in area 130 and personal screening in area 120 may be interrelated so that tasks in one of the areas cannot begin until the completion of a task in the other area. In this way, delays in both areas 120 and 130 may occur with a person causing a security alarm in the personal screening area 120. For instance, more extensive screens (such as a manual search) of an item in area 130 generally cannot begin without the presence of the owner. As a result, delays may occur in the item screen area 130 if the owner is detained in the personal screen area 120.

Upon completion of both the item and personal screens, people collect their items and leave the security checkpoint through the security checkpoint exit 140. The checkpoint exit 140 may further include gate, doors, or other structures to prevent people from entering the checkpoint from the exit 140.

As previously described, this simple configuration 100 depicted in FIG. 1 has several deficiencies, including potentially commingling people who pass and fail the metal detection test and allowing people to access items in the item screen area before completing a personal screen. Thus, a potential security risk arises in which a person may stow contraband on to cleared people or baggage. Also, the configuration of the known security module 100 may cause delays because additional searching of people in the personal screen area 120 prevent others from entering the area and potentially delays item screening in area 130.

Figure 2A:
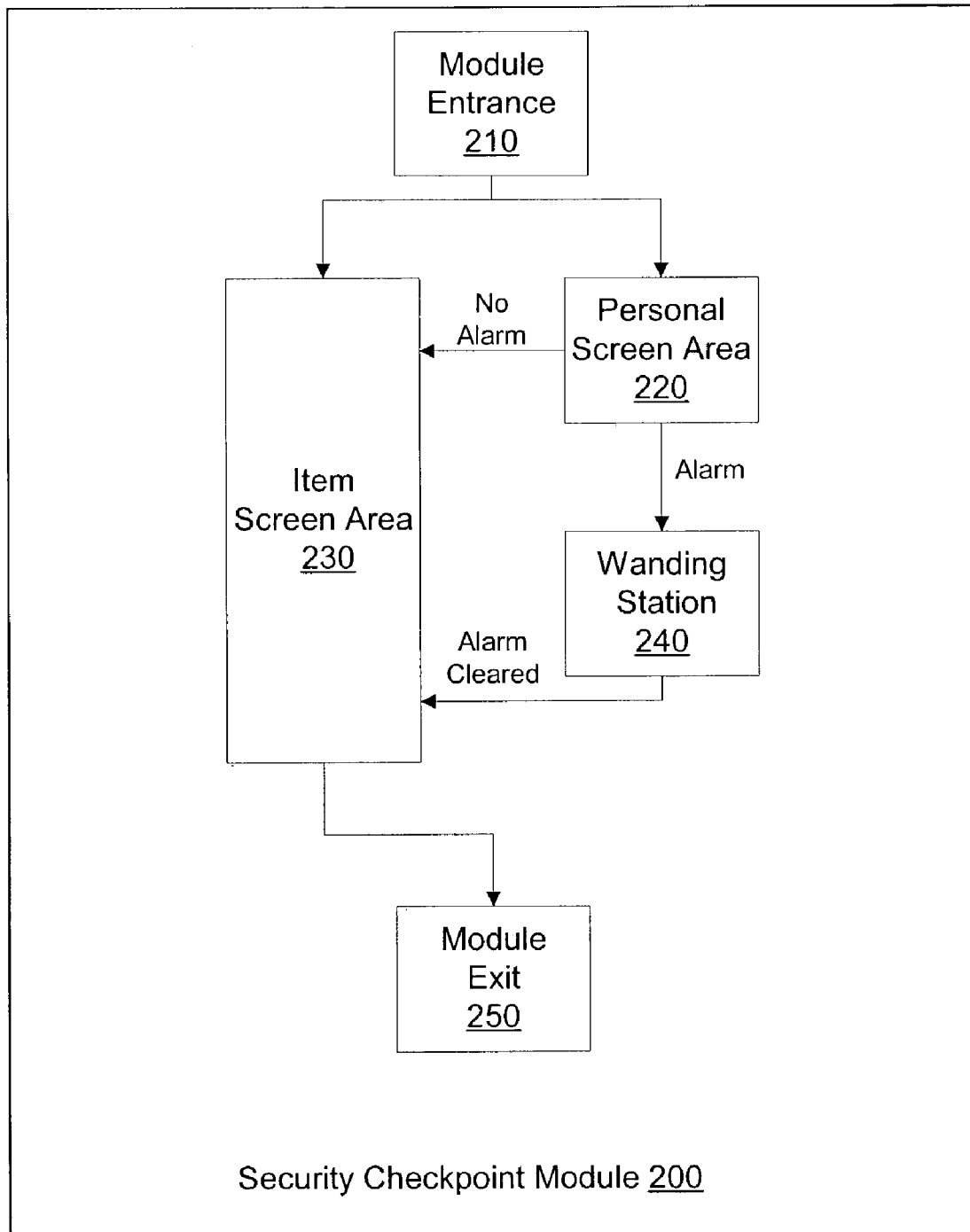
FIG. 2A is a schematic illustration of an improved security checkpoint module in accordance with an embodiment of the present invention.

In response to these deficiencies, the present invention provides a security checkpoint module 200 schematically depicted in FIG. 2A. As with the traditional security checkpoint module 100, the security checkpoint module 200 directs people to enter a checkpoint module entrance 210 where they generally prepare for personal and item screening in areas 220 and 230, respectively, as described above. It should be appreciated that the screening devices and tests used in the areas 220 and 230 may vary as needed for different security checkpoint modules 200, and such changes are anticipated by and easily incorporated into the present invention.

Continuing with FIG. 2A, the security checkpoint module 200 includes a wanding station 240 to address the deficiencies in the traditional security checkpoint module 100. The wanding station 240 is separate from the personal screen area 220 and the item screen area 230. Specifically, people selected for a further search in the personal screening area 220 (i.e., those activating an alarm by a metal detector) are directed toward the wanding station 240. In this way, the security checkpoint module 200 avoids the problems associated with a chaotic screening process and commingling. Furthermore, because the additional screening occurs in the wanding station 240, away from the personal screening area 220, other people passing through the personal screen area 220 are not significantly affected by the additional screening.

In particular, when a person causes a personal screening alarm in area 220, that person is moved to the secure wanding station 240 for more extensive searches, as needed to resolve the alarm. The resolving of the personal screen alarm in the wanding station 240 may vary depending on the security checkpoint of interest. For instance, the alarm may be resolved through a HHMD search or other tests to identify the cause for the personal screen alarm.

The wanding station 240 may be any type of enclosed area designated for further personal screening. For instance, the wanding station 240 may be a separate room. Because security checkpoints are often positioned into existing structures, a separate room may not be available or may not be convenient. Then, the wanding station 240 is a structure constructed according to the needs and resources present at the security checkpoint. For instance, the screening devices present in the checkpoint (i.e., the above described WTMD and the x-ray machine) may be positioned to form an enclosure for the wanding station 240. Alternatively, the wanding station 240 may be an enclosure defined by stanchions connected by ropes, chains, or retractable tape. Security workers in the wanding station help to ensure that a person cannot leave the wanding station until she is cleared.

Figure 2B:
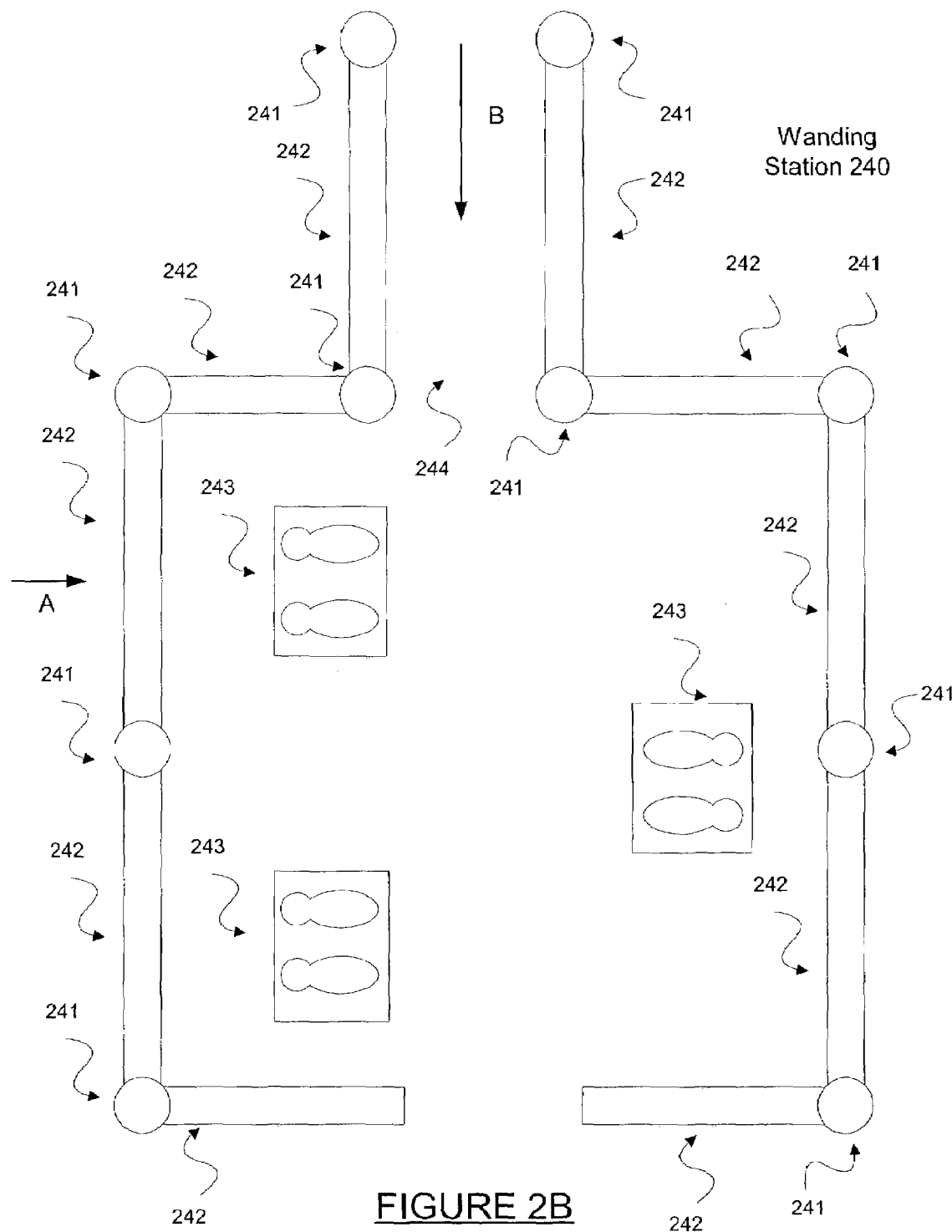
FIGS. 2B–2D depict a wanding station in accordance with embodiments of the present invention.
Figure 2C:
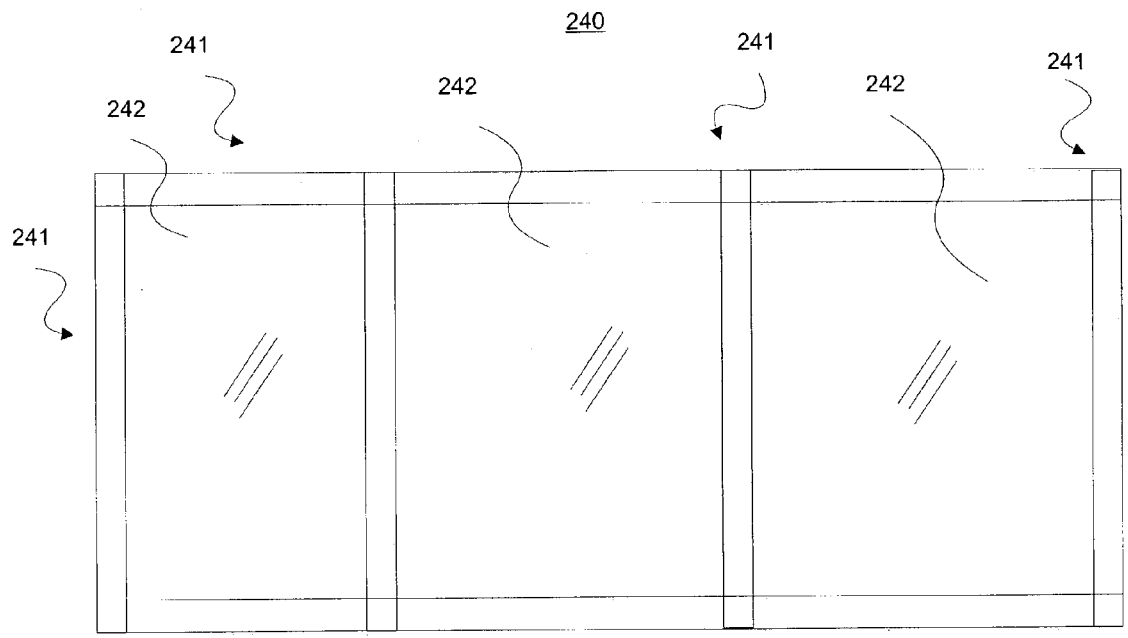
Figure 2D:
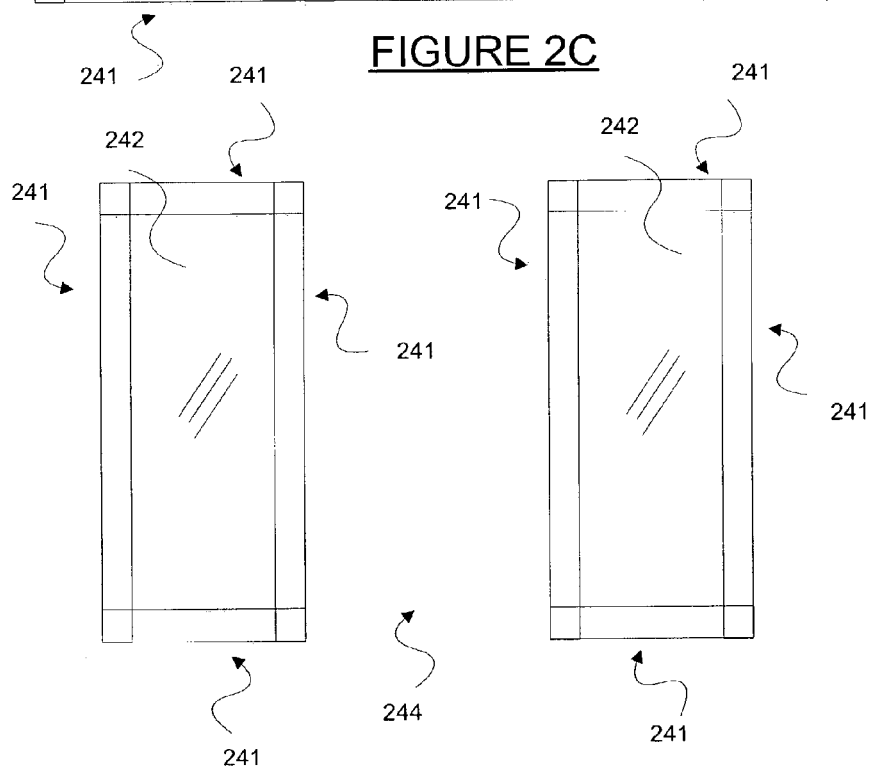

FIGS. 2B–2D depict a structure for forming the wanding station 240 in accordance with a preferred embodiment of the present invention. In particular, the wanding station 240 is formed using frame elements 241 adapted to secure wanding station walls 242. The frame elements 241 may be any type of structure that is strong enough to reliably secure the wanding station walls 242. For instance, the frame elements 241 may be metal beams or tubes to which the wanding station walls 242 are fastened. The frame elements 241 are secured to one another to form a strong structure for containing people during the additional personal screening. In the same way, the wanding station walls 242 may be any type of substantially planar structure that combines with frame elements 241 to form the desired enclosure structure. For instance, the wanding station walls 242 may be wood, metal, or plastic boards fastened to the frame elements 241.

In one embodiment, the wanding station walls 242 are substantially clear to allow people in the wanding station 240 to observe the item screening area 230. In this way, people in the wanding station 240 can track their items and alert security officials if an item is mistakenly claimed or stolen. A see-through wanding station 240 also allows security workers to observe events within the wanding station 240 and to act as needed for security purposes. Accordingly, the wanding station walls 242 may be constructed from glass, a clear plastic (such as Plexiglas®), or other substantially transparent substance.

Returning to FIG. 2B, the wanding station 240 may be dimensioned as allowed in the structure containing the security checkpoint module 200. Also, the wanding station 240 may be dimensioned as needed for the security checkpoint. For example, detailed modeling and simulations may be used to determine a wanding station size and capacity as needed achieve adequate throughput through the security checkpoint module 200. FIG. 2B depicts a wanding station 240 having three substations 243 for simultaneously screening three people. The substations 243 are depicted as wanding footpads that guide people to proper positions for screening in the wanding station 240. It has been determined through modeling and testing that three substations are often the optimal minimal capacity for the wanding station 240 without significantly affecting the throughput of the checkpoint. Accordingly, a preferred implementation of the wanding station 240 provides sufficient room for concurrent screening of three people. This wanding station has dimensions of approximately nine feet wide (in the X direction of FIG. 2B), thirteen feet long (in the Y direction of FIG. 2B), and six feet high. It should be appreciated that the wanding station 240 may be any other size as needed for a particular security checkpoint 200. Specifically, the wanding station 240 may be shaped and dimensioned according to the available space. Furthermore, the size of the wanding station (and the corresponding capacity) may be modified according to the desired throughput of the security checkpoint module.

When the wanding station 240 is filled to capacity, the security checkpoint module 200 closes until the completion of the screening of at least one of the substations 243. Otherwise, a person causing an alarm in the personal screening area 220 has nowhere to go and becomes a potential security risk. To increase the capacity of the wanding station 240 and, thus, minimize the closings of the security checkpoint module 200, the wanding station 240 may further include a neck area 244 in which passengers form a queue for entering the wanding station 240, as depicted in FIG. 2B. In a particular implementation, the neck area 244 is designed to hold six passengers, thus substantially increasing the number of people in wanding station 240 before closing checkpoint module 200. To accommodate a line of six people, the neck area 244 may have a dimension of approximately six feet wide and four feet deep.

FIGS. 2C and 2D further depict the structure of the wanding station 240 from a side view and from a front view, respectively. Specifically, FIG. 2C illustrates the side view of the wanding station as viewed along direction A in FIG. 2B, and FIG. 2D illustrates the side view of the wanding station as viewed along direction B in FIG. 2B. As described above, the frame elements 241 form a skeleton for securing the wanding station walls 242. Furthermore, the frame elements 241 and the wanding walls are positioned as needed to form a wanding station 240 of desired dimensions and to form the components of the wanding are 240, such as the above-described neck area 244.

Figure 3:
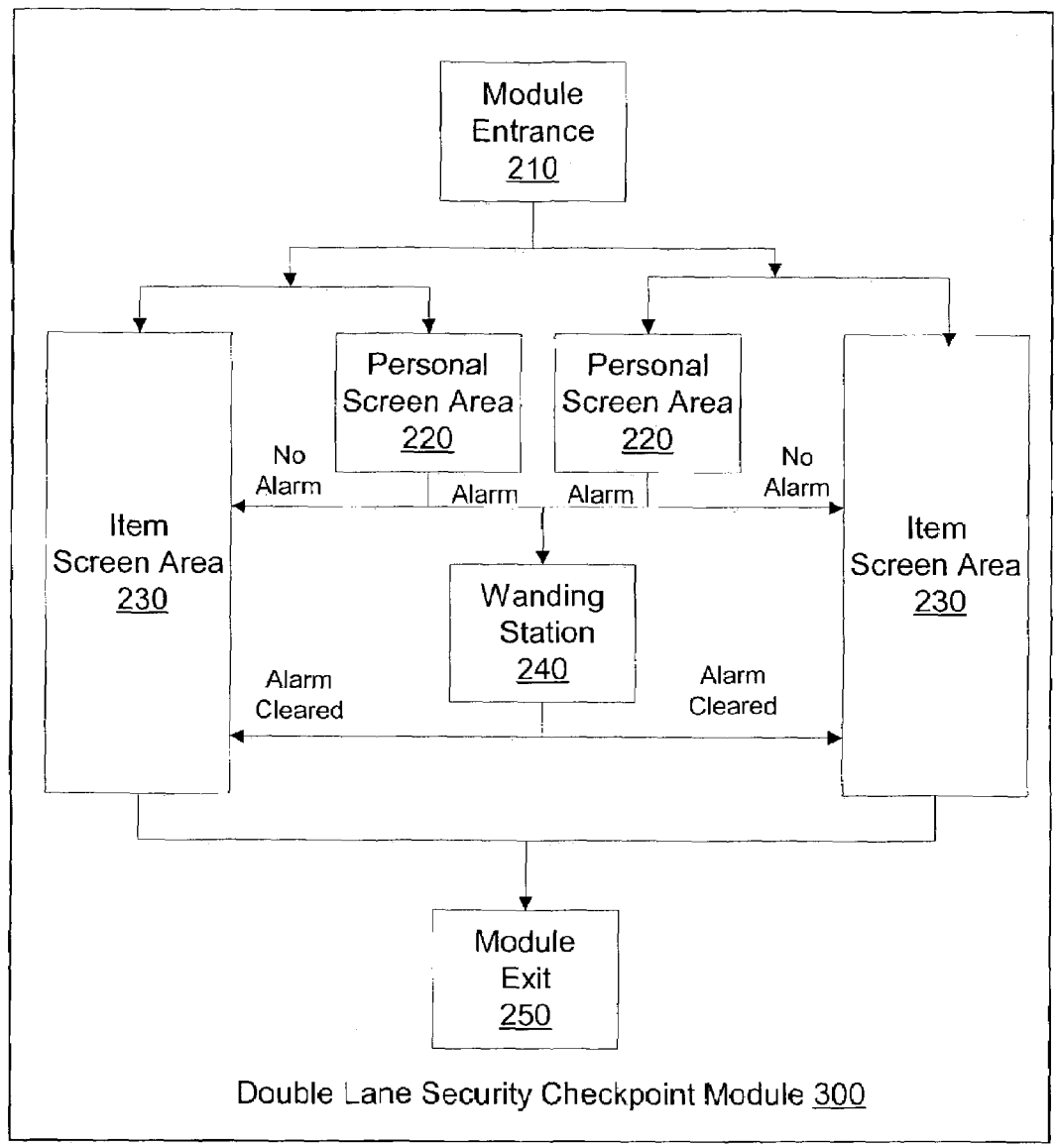
FIG. 3 is a schematic illustration of a double lane security checkpoint module in accordance with another embodiment of the present invention.

Turning now to FIG. 3, another preferred embodiment of the present invention provides a double lane security module 300. The double lane security module 300 generally includes two item screen areas 230 and two personal screen areas 220 that share a wanding station 240. While FIG. 3 depicts and the following text describes a wanding station 240 shared by corresponding pairs of screening areas 220 and 230, it should be appreciated that a single wanding station 240 may be combined with any number of screening areas 220 and 230. For example, throughput at a security checkpoint module 200 may be improved by having two or more item screening areas 230 for each personal screening area 220.

The double lane security module 300 generally allows for more efficient use of space and security resources. Specifically, the wanding station 240 typically requires a relative large area and a large number of security workers. Also, the use of a single wanding station 240 improves security by allowing the monitoring of potentially dangerous people in a single, controlled area.

Continuing with FIG. 3, the double lane security module 300 is optimally physically configured to maximize the capacity of the checkpoint module 300. For instance, the entrances to the personal screen areas 220 and the item screen areas 230 are proximate to allow people to enter the double lane security module 300 more efficiently and, preferably are less than one foot apart. Furthermore, the exit from the wanding station 240 is close to the exit from the item screen areas 230 so that a person leaving the wanding station 240 does not need to travel upstream, against the flow to people, to recover her items from the item screen area 230.

Continuing with FIG. 3, the wanding station 240 is generally positioned proximately to personal screening area 220 so that people may rapidly move from the personal screening area 220 to the wanding station 240. In the same way, the wanding station 240 may be located between the item screen areas 230 to allow people to monitor their items.

Figure 4:
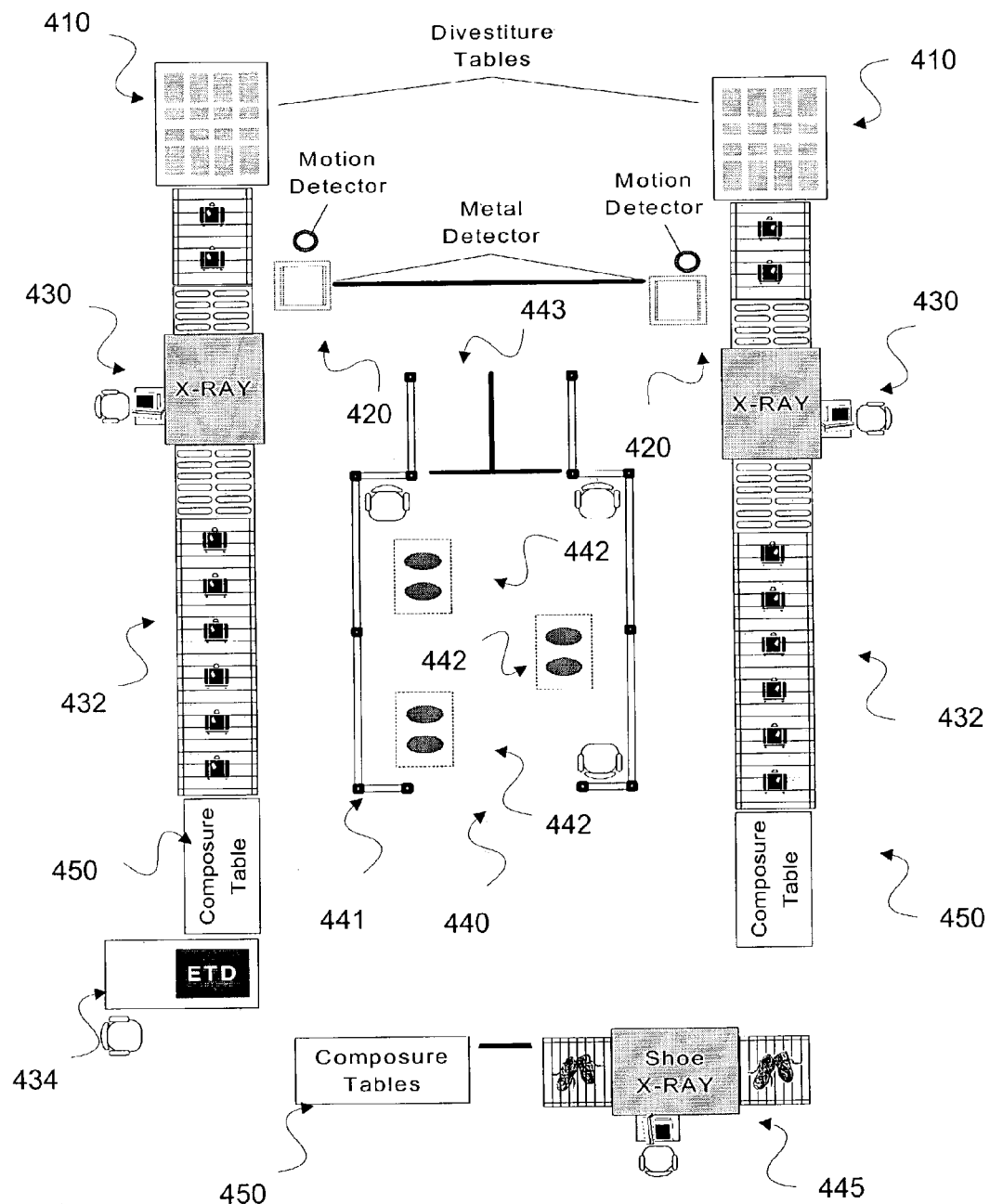
FIG. 4 depicts an exemplary checkpoint module illustrating the elements of the double lane security checkpoint module of FIG. 3 in accordance with embodiments of the present invention.

Turning now to FIG. 4, some of the specific elements of an exemplary double lane security module 400 are illustrated. Specifically, the exemplary double lane security module 400 includes a wanding station 440 enclosed in glass or other sturdy materials constructed within the confines of the two x-ray machines 430, as described above.

The exemplary double lane security module 400 includes two x-ray machines 430, two x-ray roller extensions 432, two one small item x-ray 445, two Walk-Through-Metal Detectors (WTMD) 420, an Electronic Trace Detection (ETD) machine 434, divestiture tables 410, composure tables 450, and the wanding station 440. It should be appreciated that any type or combination screening devices may be used in a security module, according to the needs of the checkpoint.

The exemplary double lane module 400 optimally uses thirteen security workers for efficient operation, including: two WTMD Operators stationed on the exit side of each WTMD 420; two x-ray Operators stationed at the x-ray monitor stations 430; three Wand Operators stationed inside the wanding station 440; a Shoe Runner stationed just outside the wanding station 440, two ETD Operators stationed behind the ETD station 434, a Bin Runner stationed at the composure tables 450; one Checkpoint Supervisor stationed towards the rear of the double module; and a small item x-ray operator stationed at a small item x-ray 445.

The wanding area 440 (corresponding to above described wanding area 240) is defined by structure 441 that may be formed using the frame elements 241 form a skeleton for securing the wanding station walls 242. The wanding area 440 further includes wanding substations 442 and an entry area 443 corresponding to the above described elements 243 and 244.

Continuing with FIG. 4, the exemplary double lane module 400 may be configured to improve its efficiency. For instance, the WTMD 420 should be split far apart to provide most people (i.e., those not selected for further screening in the wanding station) a direct, straight walkway to proceed directly to collect their items at the end of the x-ray lane 430. Similarly, the exemplary double lane module 400 may have x-ray lanes 430 that are slightly staggered to prevent divestiture and composure areas (410 and 450) from lining up and causing passenger flow choke points. Also, the x-ray lanes 430 may have extenders 432 so that people leaving the wanding station 440 may proceed directly to their items without traveling upstream, against the flow of other people, to recover the items from the item screen area. The extenders 432 may be a set of rollers, a moving conveyer belt, or some other type of known structure for receiving items from the x-ray 430 and transporting these items to a desired location, generally near the exit to the wanding station 440. In addition, efficiency of the checkpoint is improved because the composure bottleneck is dispersed along the entire length of the extenders 432.

As described above, the wanding station 240 is optimally sized according to space limitations and capacity needs of the checkpoint. As a result, additional security test equipment to improve the efficiency and/or thoroughness of the screening may be positioned outside of the wanding station. For example, FIG. 4 depicts a small-item x-ray machine 445 positioned proximately to the wanding station 440. The small item x-ray allows security workers to screen small personal items, such as shoes and coats, relatively quickly. This screening functionality speeds the amount of time a person spends in the Wanding Station 440 by having personal items scanned concurrently with other personal screenings.

Figure 5:
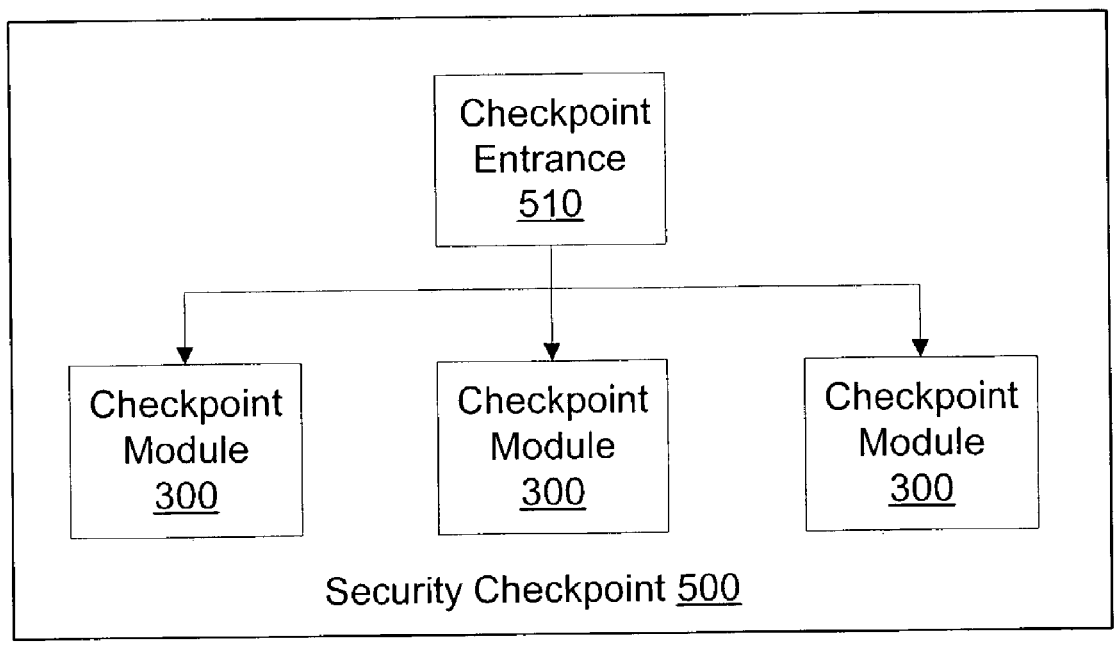
FIG. 5 is a schematic illustration of checkpoint formed using the double lane security checkpoint modules of FIG. 3 in accordance with an embodiment of the present invention.

Turning now to FIG. 5, a security checkpoint 500 may have a single checkpoint entrance 510 that leads to multiple security modules 300. The checkpoint entrance 510 represents the waiting area for entering the security checkpoint 500. The checkpoint entrance 510 may employ two workers—a Ticket Checker to control entrance to the checkpoint entrance 510 and a Line Monitor to control the passenger flow to the next available security module 300.

In one embodiment, the checkpoint entrance 510 is a serpentine entry queue (not depicted) that provides several benefits. The entry queue gives security workers time to properly educate people on the security checkpoint process. Secondly, a single, fast moving queue generally creates a sense of a shorter delay in comparison to multiple slow, short queues. Furthermore, the serpentine entry queue provides the capacity to handle more people in the same physical space.

In another embodiment, the checkpoint entrance 510 includes separate lines, one line for the general public, and a straight line for designated groups such as employees, pregnant women, people with pacemakers, elderly travelers, people with small children, passengers with unwieldy items (e.g. strollers, car seats), and people with disabilities.

Typically, movable stanchions are used to configure the security checkpoint entrance 510 and to direct the people through the checkpoint entrance 510. It is typically the responsibility of a security worker to reconfigure the checkpoint entrance 510 needed to accommodate the number of people waiting to enter the checkpoint modules 300.

Continuing with FIG. 5, multiple security checkpoint modules 300 may be combined together as needed to form the checkpoint 500. Furthermore, the checkpoint modules 300 may be positioned according to the available physical layout and as necessary for optimal checkpoint efficiency.

Figure 6:
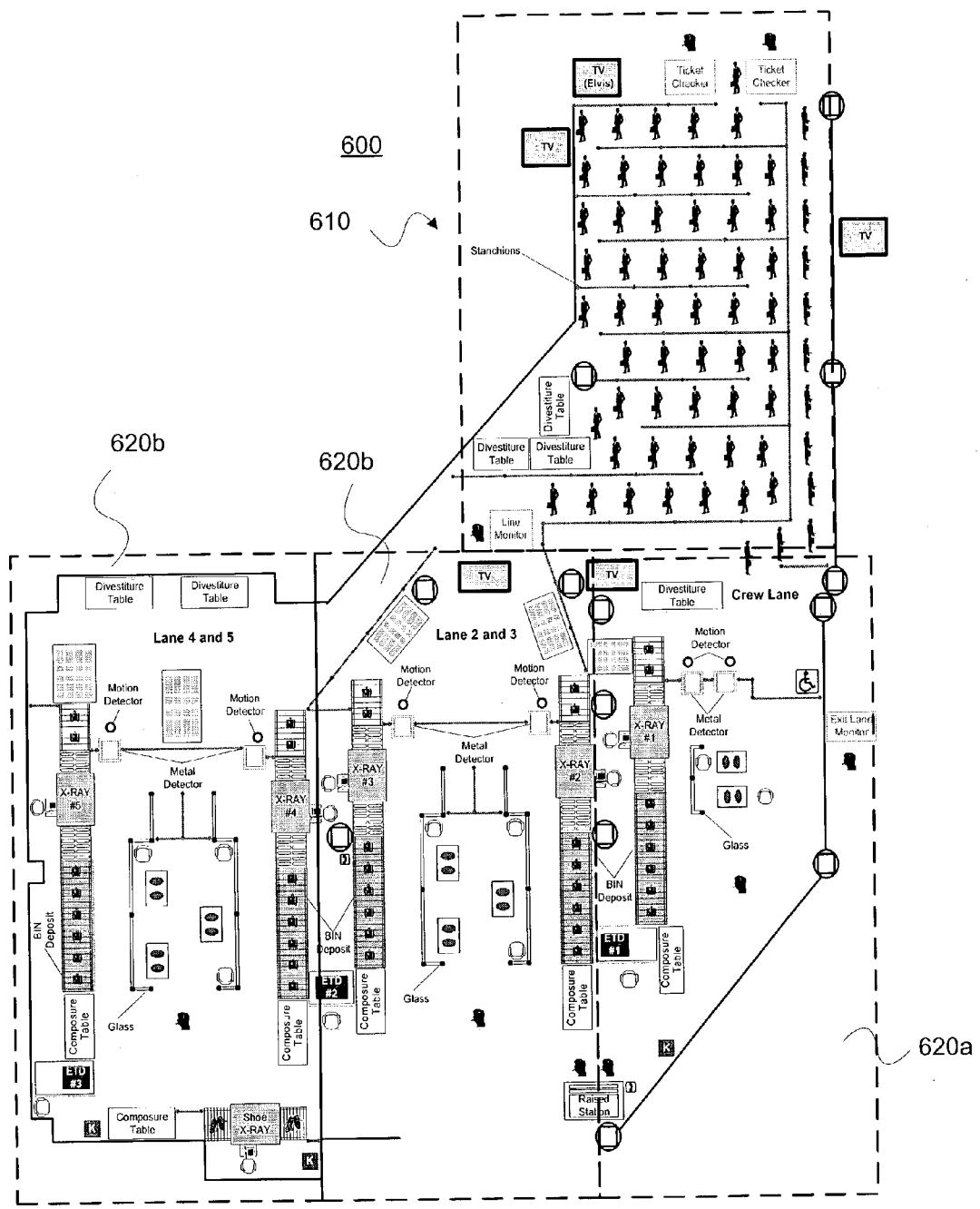
FIG. 6 depicts an exemplary checkpoint illustrating the elements of the security checkpoint of FIG. 5 in accordance with embodiments of the present invention.

Turning now to FIG. 6, an exemplary security checkpoint 600 illustrates the combination of various checkpoint modules and the checkpoint entrance, as described above in FIG. 5. In particular, the exemplary security checkpoint 600 has an entrance area 610 with a serpentine line and a bypass line. The exemplary security checkpoint 600 further contains several security checkpoint modules 620a and 620b. As can be appreciated, the dimensions of the modules are adapted to fit the available space. In exemplary security checkpoint 600, the checkpoint entrance 610 and the checkpoint modules 620a and 620b have been configured to fit in to an L-shaped area. Further, it should be noted that the illustrated checkpoint 600 includes both a single lane module 620a (corresponding to module 200) and double modules 620b (corresponding to the double lane module 300).

The security checkpoint configurations of the present invention may be easily replicated across airports and practically any other security checkpoint. This includes but is not limited to stadium, cargo, ports, sea, highways, and border checkpoints.

CONCLUSION

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A security checkpoint module comprising:
   an item screening device for screening one or more of a person's items, said item screening device including an input end for inserting said items and an output end for receiving the items from the item screening device;
   a personal screening device for screening the person, wherein the personal screening device produces an alarm if the personal screening device detects the need for further screening of the person;
   an enclosure for holding the person for further screening if the personal screening device produces an alarm, wherein the enclosure is physically separated from the personal screening device and the item screening device; and
   a small item screening device, said small item screening device positioned to receive and screen personal items from the enclosure.

2. The security checkpoint module of claim 1 wherein the item screening device and the personal screening device are positioned within 12 inches or less.

3. The security checkpoint module of claim 1 wherein the enclosure is surrounded by a wall comprising support beams and planer wall units fastened to the support beams.

4. The security checkpoint module of claim 3 wherein said planer wall units are substantially transparent and wherein the person, when in the enclosure, can view items in the item screening device.

5. The security checkpoint module of claim 1 wherein the enclosure includes an entry area and wherein the entry area is adapted to allow for formation of a queue for entering the enclosure.

6. The security checkpoint module of claim 5 wherein the entry area is adapted to allow six people to join the queue before filling the entry area.

7. The security checkpoint module of claim 1, wherein an exit to the enclosure is positioned to allow the person to leave the enclosure and collect items from the item screening device without traveling upstream against other people.

8. The security checkpoint module of claim 7 wherein the item screening device includes an extender that positions the item leaving the item screening device next to the enclosure exit.

9. The security checkpoint module of claim 1 wherein the enclosure comprises an entrance, wherein the entrance is positioned proximate to the personal screening device.

10. The security checkpoint module of claim 1 whereby the item screening device, the personal screening device, and the enclosure are configured such that, if the personal screening does not produce an alarm, the person may place the item into the item screening device, pass through the personal screening device, and retrieve the item from the item screening device in a substantially straight path.

11. The security checkpoint module of claim 1 further comprising a second item screening device and a second personal screening device.

12. The security checkpoint module of claim 1 wherein the enclosure is configured to simultaneously screen of three people.

13. The security checkpoint module of claim 1 further comprising a checkpoint entrance, the checkpoint entrance including a serpentine line.

14. A method for screening a person at a security checkpoint, the method comprising:
    performing a first personal screening to determine whether to perform a second personal screening;
    if the first personal screening determines a need to perform the second personal screening, moving the person to an enclosure; and
    performing the second personal screening in the enclosure, wherein the second personal screening includes use of a small-item x-ray to screen a personal item.

15. The method of claim 14, wherein the person in the enclosure can view a screening of the person's items.

16. The method of claim 15, wherein the enclosure comprises a substantially transparent wall.

17. The method of claim 14, wherein the second personal screening includes using of a hand-held metal detector.

18. The method of claim 14, wherein if the first personal screening determines an absence of a need to perform the second personal screening, the person passes through the security checkpoint in a substantially straight path.

19. The method of claim 14 further comprising the step of, following the second personal screening, the person leaving the enclosure and recovering a screened item without traveling upstream.

20. The method of claim 14, wherein either a first or a second personal screening device perform the first personal screening.

21. The method of claim 14 wherein the enclosure is adapted such that the second personal screening may occur simultaneously for three or more people.

22. A security checkpoint comprising:
   an entrance; and
   at least one checkpoint module, the module comprising:
      an item screening area including an input area that receives an item deposited by a person, an item screening device that screens the item, and a output area that returns the item to the person after completion of a first and a second personal screenings,
      a personal screening area positioned adjacent to the item screening area, the person entering the personal screening area after depositing the item in the input area, the personal screening area performing a first personal screening to determine the presence of a need to perform a second personal screening, the person leaving the personal screening area and retrieving the item from the output area in a substantially straight path if the need to perform the second personal screening is not present,
      an enclosure, the person leaving the personal screening area and entering the enclosure if the first personal screening determines the presences of the need to perform the second personal screening, the second personal screening occurring in the enclosure, the enclosure being physically separated from the item screening area and the personal screening area, and
      a screening device positioned outside the enclosure that assists in the second personal screening.

23. The security checkpoint of claim 22, wherein the item screening area is a first item screening area and the checkpoint module further comprises a second item screening area.

24. The security checkpoint of claim 23 wherein the first and the second item screening areas are offset.

25. The security checkpoint of claim 22 wherein the enclosure includes an exit, and the exit is positioned proximately to the output area.

26. The security checkpoint of claim 25 wherein the item screening area comprises an extension connecting the item screening device and the output area.

27. The security checkpoint of claim 22 wherein the enclosure comprises a substantially transparent planer surface.

28. The security checkpoint of claim 22 wherein the enclosure comprises an entry area in which a queue may form for entering the enclosure if the enclosure is full.

29. The security checkpoint of claim 22 wherein the enclosure further comprises a position footprint that guides the person to a proper position for the second personal screening.

* * * * *